(12) United States Patent
Jaradi et al.

(10) Patent No.: US 12,043,196 B1
(45) Date of Patent: Jul. 23, 2024

(54) MOONROOF ASSEMBLY INCLUDING AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/178,804

(22) Filed: Mar. 6, 2023

(51) Int. Cl.
| | |
|---|---|
| *B60R 21/213* | (2011.01) |
| *B60J 7/043* | (2006.01) |
| *B60R 21/217* | (2011.01) |
| *B60R 21/264* | (2006.01) |
| *B60R 21/13* | (2006.01) |
| *B60R 21/16* | (2006.01) |

(52) U.S. Cl.
CPC ............ *B60R 21/213* (2013.01); *B60J 7/043* (2013.01); *B60R 21/217* (2013.01); *B60R 21/264* (2013.01); *B60R 2021/138* (2013.01); *B60R 2021/161* (2013.01)

(58) Field of Classification Search
CPC .................................................. B60R 21/213
See application file for complete search history.

(56) References Cited

U.S. PATENT DOCUMENTS

| | | | | |
|---|---|---|---|---|
| 6,189,960 B1 * | 2/2001 | Mumura | ............... | B60R 21/214 180/281 |
| 7,828,106 B1 * | 11/2010 | Ratajski | .................. | B60R 21/13 296/210 |
| 9,610,915 B2 * | 4/2017 | Specht | .................. | B60R 21/233 |
| 9,771,048 B2 * | 9/2017 | Min | .................... | B60R 21/2338 |
| 9,994,182 B1 * | 6/2018 | Jaradi | ................... | B60R 21/214 |
| 10,272,868 B2 | 4/2019 | Jaradi et al. | | |
| 10,399,527 B2 * | 9/2019 | Schütt | ..................... | B60R 21/08 |
| 10,427,637 B2 * | 10/2019 | Raikar | ....................... | B60J 7/02 |
| 11,254,277 B2 * | 2/2022 | Jeong | .................... | B60R 21/013 |
| 11,332,094 B2 | 5/2022 | Farooq et al. | | |
| 11,427,145 B2 * | 8/2022 | Lee | ......................... | B60R 21/26 |
| 11,565,648 B1 * | 1/2023 | Christiansen | ....... | B60R 21/2334 |

(Continued)

FOREIGN PATENT DOCUMENTS

| | | | | |
|---|---|---|---|---|
| DE | | 2020360 A1 * | 11/1971 | |
| DE | | 19744817 A1 * | 4/1999 | ........... B60R 19/205 |

(Continued)

OTHER PUBLICATIONS

"World's First Roof Airbag Is Born", Apr. 20, 2020 Hyundai MOBIS, https://www.hyundaimotorgroup.com/story/CONT0000000000001173.

*Primary Examiner* — Nicole T Verley
(74) *Attorney, Agent, or Firm* — Frank A. MacKenzie; Bejin Bieneman PLC

(57) ABSTRACT

A vehicle includes a vehicle body defining a moonroof opening and a moonroof. The moonroof is moveably supported by the body and is moveable relative to the moonroof opening between an open position and a closed position. An airbag is mounted to the vehicle body. An inflator is in fluid communication with the airbag. A pyrotechnic device is operatively connected to the airbag to pull the airbag across the moonroof opening.

16 Claims, 9 Drawing Sheets

(56) References Cited

U.S. PATENT DOCUMENTS

| | | | |
|---|---|---|---|
| 2007/0052226 A1* | 3/2007 | Tobaru | B60R 21/13 |
| | | | 280/756 |
| 2009/0174174 A1 | 7/2009 | McCoy | |
| 2010/0100285 A1* | 4/2010 | Tobaru | B60R 21/13 |
| | | | 701/45 |
| 2017/0015269 A1* | 1/2017 | Min | B60R 21/214 |
| 2017/0267199 A1* | 9/2017 | Schütt | B60R 21/13 |
| 2018/0162314 A1* | 6/2018 | Lee | B60R 21/2338 |
| 2019/0210555 A1* | 7/2019 | Koo | B60R 21/237 |
| 2021/0155197 A1* | 5/2021 | Jeong | B60R 21/2334 |
| 2021/0179004 A1* | 6/2021 | Lee | B60R 21/214 |
| 2021/0245692 A1* | 8/2021 | Lee | B60R 21/013 |
| 2021/0300286 A1* | 9/2021 | Young | B60R 21/13 |
| 2022/0118933 A1 | 4/2022 | Jaradi et al. | |
| 2022/0306031 A1* | 9/2022 | Lee | B60R 21/231 |
| 2022/0355760 A1* | 11/2022 | Dinsdale | B60R 21/213 |

FOREIGN PATENT DOCUMENTS

| | | | | |
|---|---|---|---|---|
| DE | 19853479 A1 * | 8/1999 | | B60J 7/0015 |
| DE | 101702458 B1 * | 2/2017 | | |
| DE | 102016119134 A1 * | 4/2017 | | B60R 21/13 |
| DE | 202019000013 U1 * | 3/2019 | | B60R 21/213 |
| DE | 102021118306 A1 * | 1/2023 | | |
| EP | 2108547 A1 * | 10/2009 | | B60R 19/42 |
| FR | 2798633 A1 * | 3/2001 | | B60R 19/205 |
| KR | 20160027706 A * | 3/2016 | | |

* cited by examiner

MOONROOF ASSEMBLY INCLUDING AIRBAG

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during the vehicle impact. The airbag assemblies may be located at various positions in the passenger compartment of the vehicle and on an exterior of the vehicle.

DETAILED DESCRIPTION

Figure 1:
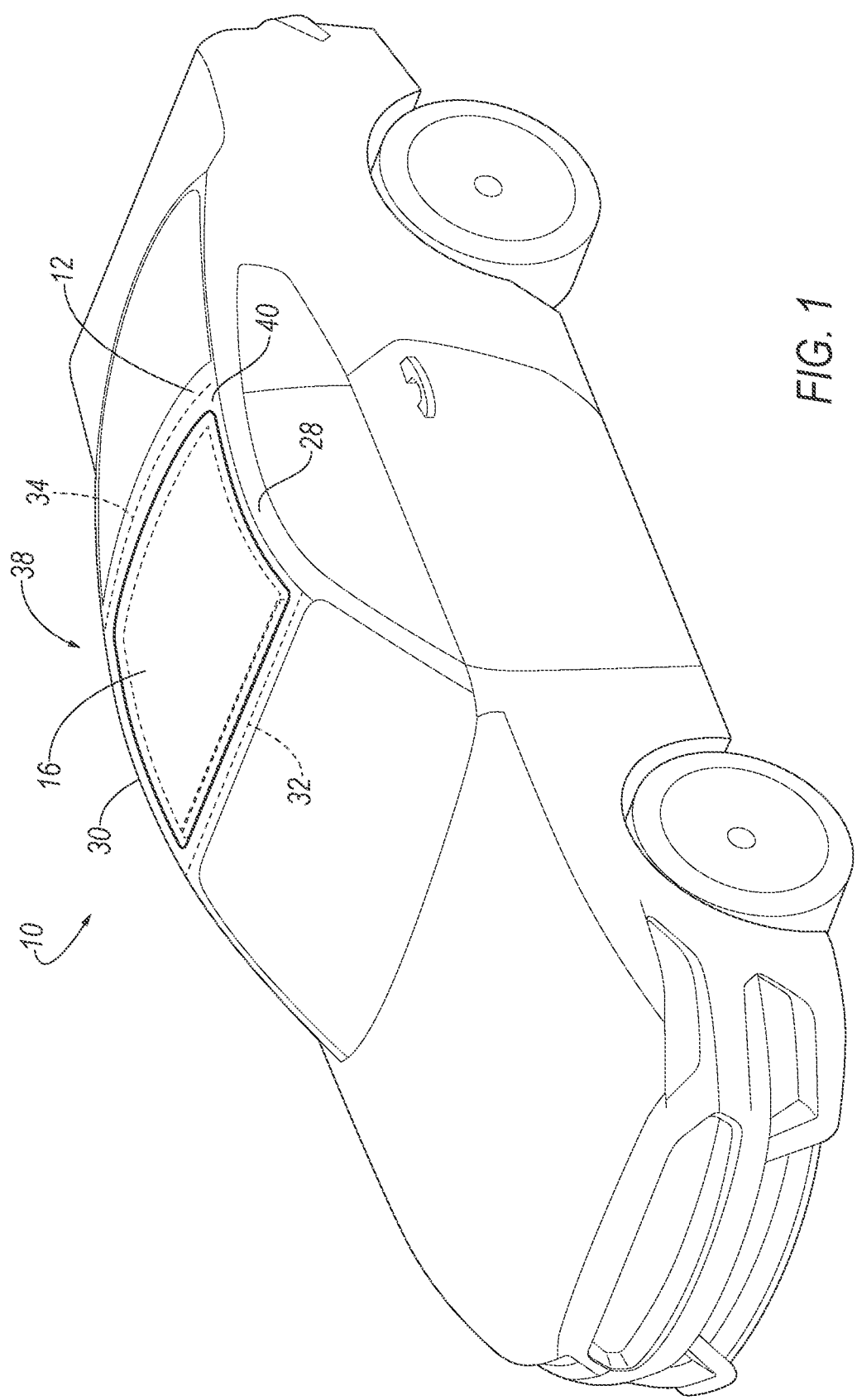
FIG. 1 is a perspective view of a vehicle with a moonroof assembly in a closed position with an airbag shown in broken lines under a moonroof of the moonroof assembly.

A vehicle includes a vehicle body defining a moonroof opening. A moonroof is moveably supported by the body and is moveable relative to the moonroof opening between an open position and a closed position. An airbag is mounted to the vehicle body. An inflator is in fluid communication with the airbag. A pyrotechnic device is operatively connected to the airbag to pull the airbag across the moonroof opening.

The vehicle may include a track elongated along the moonroof opening, the airbag being slideable along the track. The pyrotechnic device may include a shuttle fixed to the airbag and slideably engaged with the track. The pyrotechnic device may include a pyrotechnic charge housed in the shuttle. The vehicle may include a lock between the track and the shuttle, the shuttle being moveable by the pyrotechnic device from an undeployed position to a deployed position, and the lock being designed to prevent movement of the shuttle from deployed position toward the undeployed position. The lock may include a spring-loaded pin on one of the track and the shuttle and a hole on the other of the track and the shuttle, the spring-loaded pin being designed to extend into the hole in the deployed position. The airbag may be fixed to the shuttle and move with the shuttle along the track.

The pyrotechnic device may be fixed to the vehicle body and a tether may be connected to the airbag, the tether extending from the pyrotechnic device and being retractable into the pyrotechnic device.

The vehicle may include a pair of tracks spaced from each other cross-vehicle and elongated in parallel along the moonroof opening. The moonroof opening has a vehicle-forward end and a vehicle-rearward end, the airbag being mounted at the vehicle-forward end and the pyrotechnic device mounted to the vehicle-rearward end.

The moonroof opening may have a vehicle-forward end and a vehicle-rearward end, the airbag being mounted at the vehicle-forward end and the pyrotechnic device mounted to the vehicle-rearward end.

The vehicle body may define a passenger cabin and the airbag is inflatable exterior to the passenger cabin. The vehicle body may define a passenger cabin, the vehicle body having an interior facing the passenger cabin and an exterior opposite the interior, the airbag being inflatable above the exterior.

The vehicle may include a computer having a processor and memory storing instructions executable by the processor to inflate the airbag and activate the pyrotechnic device in response to detection of certain vehicle impacts and detection of the moonroof in the open position.

The airbag may be inflatable to an inflated position in which the airbag covers the moonroof opening exterior to the vehicle body.

With reference to the Figures, wherein like numerals indicate like parts throughout the several views, a vehicle 10 includes a vehicle body 12 defining a moonroof opening 14 and a moonroof 16. The moonroof 16 is moveably supported by the vehicle body 12 and is moveable relative to the moonroof opening 14 between an open position and a closed position. An airbag 18 is mounted to the vehicle body 12. An inflator 20 is in fluid communication with the airbag 18. A pyrotechnic device 22 is operatively connected to the airbag 18 to pull the airbag 18 across the moonroof opening 14.

Figure 4:
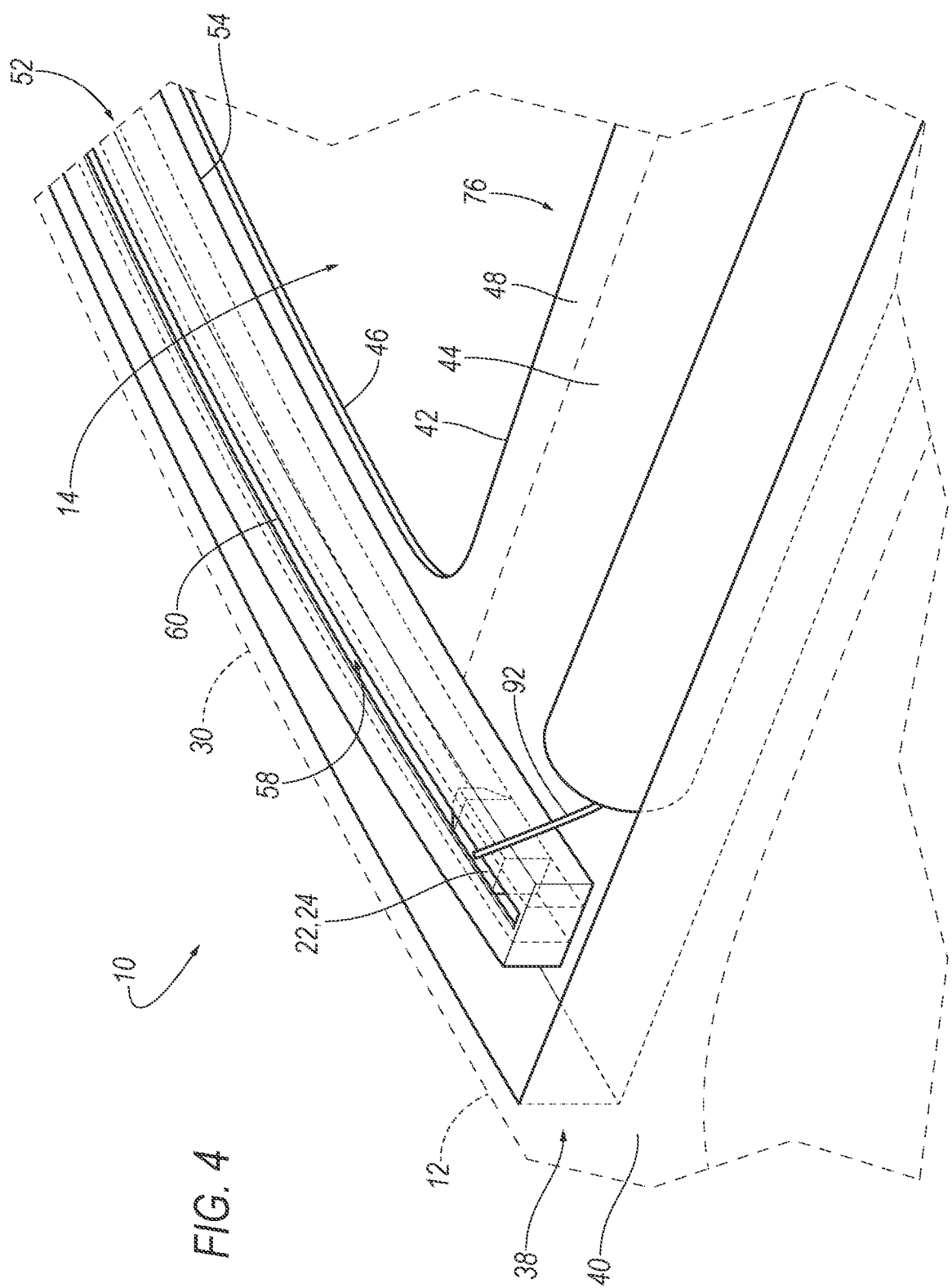
FIG. 4 is a magnified view of a portion of FIG. 2.
Figure 5A:
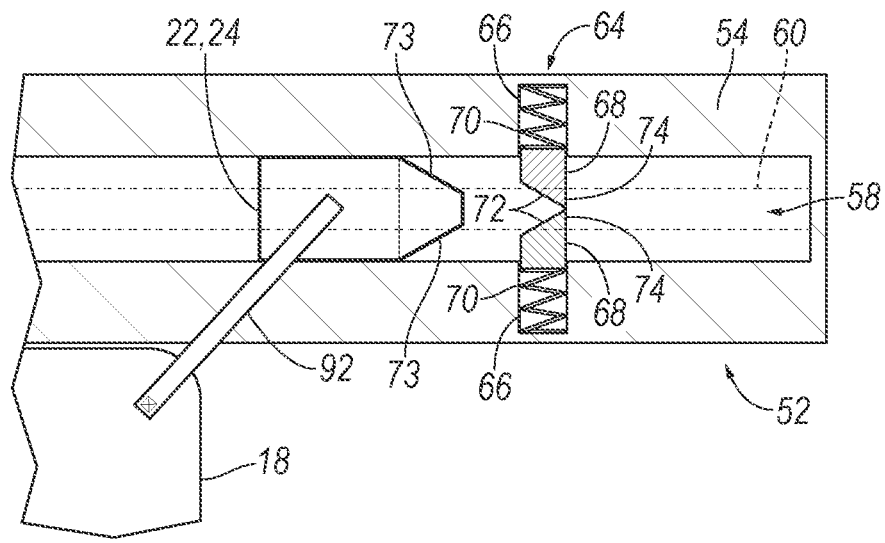
FIG. 5A is a top view of a vehicle-rearward end of a track of the airbag deployment system during deployment of a shuttle of the airbag deployment system.
Figure 5B:
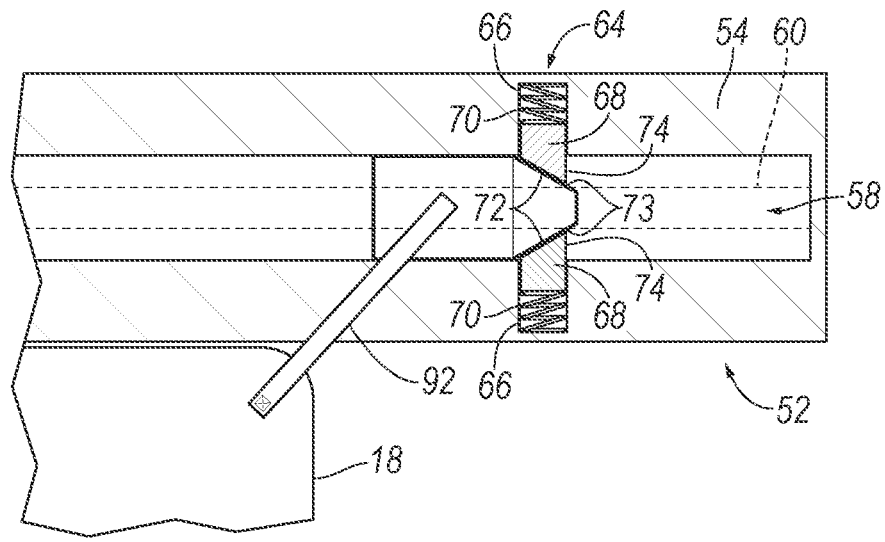
FIG. 5B is a top view of the vehicle-rearward end of the track with the shuttle engaging a lock of the airbag deployment system.
Figure 5C:
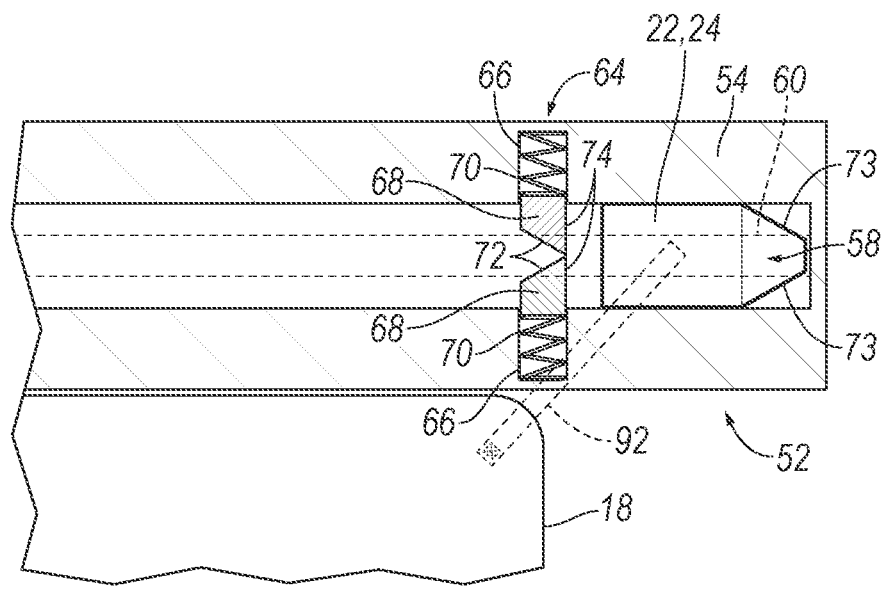
FIG. 5C is a top view of the vehicle-rearward end of the track with the shuttle locked at the vehicle-rearward end of the track by the lock.
Figure 6:
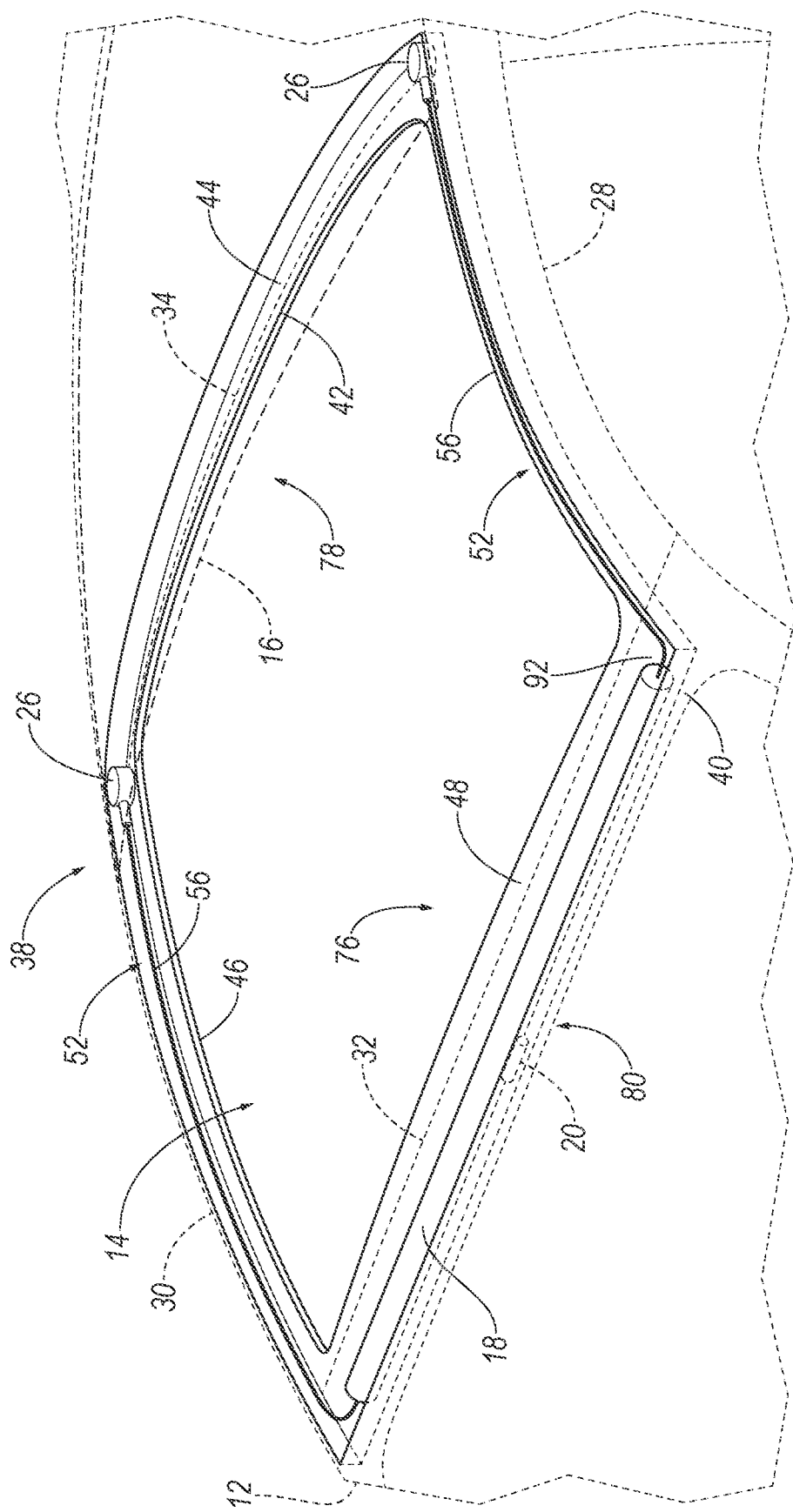
FIG. 6 is a perspective view of a portion of the vehicle with the moonroof in an open position and showing the airbag uninflated and another example of an airbag deployment system.

The airbag 18 is inflatable from an uninflated position, as shown in FIGS. 1-5, to an inflated position, as shown in FIG. 6, when the moonroof 16 is in the open position Since the pyrotechnic device 22 pulls the airbag 18 across the moonroof opening 14, the airbag 18 extends across the moonroof opening 14 in the inflated position. The airbag 18 across the moonroof opening 14 in the inflated position controls the kinematics of the occupant at the moonroof opening 14. The airbag 18 across the moonroof opening 14 in the inflated position may also obstruct entry of debris from entering into the vehicle 10 through the moonroof opening 14.

Figure 7:
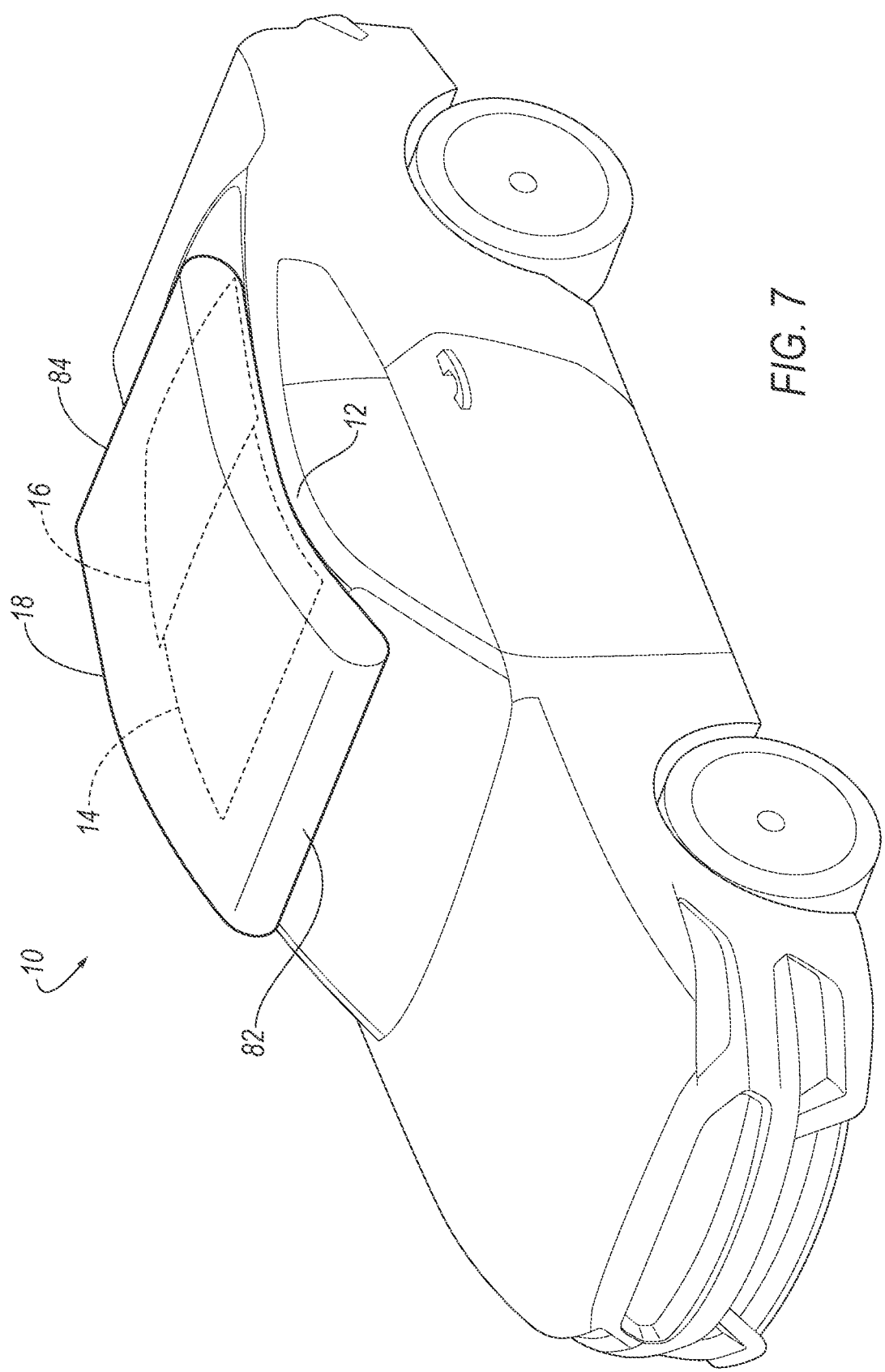
FIG. 7 is a perspective view of the vehicle with the airbag inflated and deployed.
Figure 8:
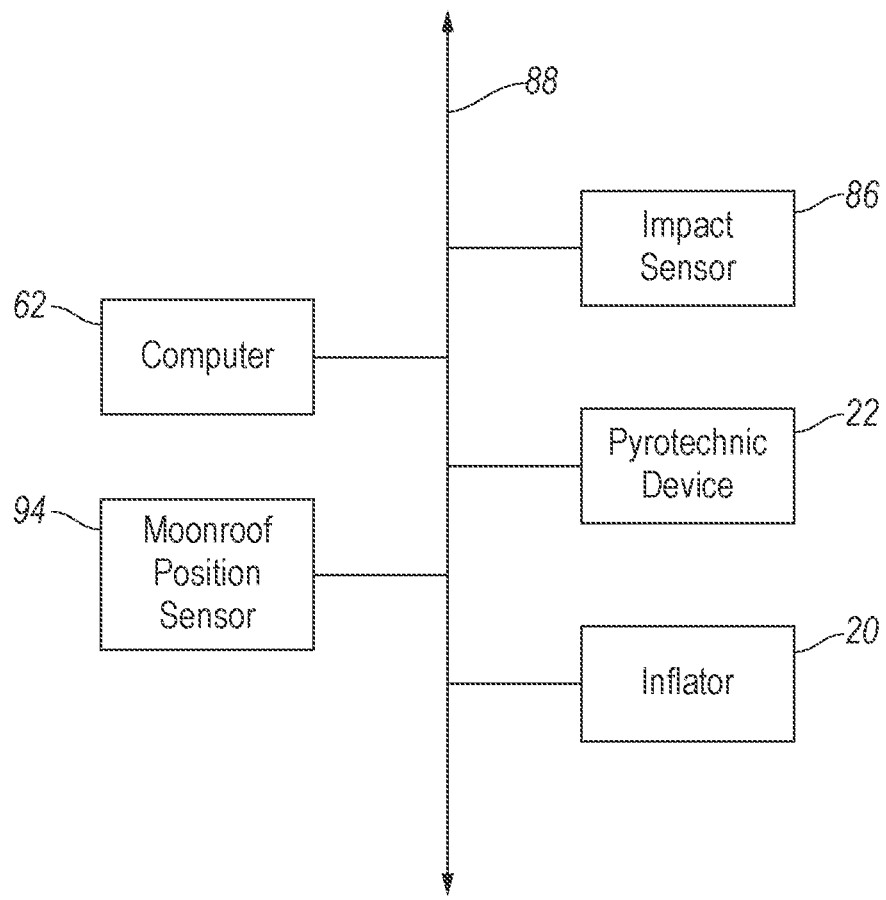
FIG. 8 is a block diagram of a system of the vehicle.

Two examples of a moonroof assembly 50 are shown in the Figures. Specifically, in the example shown in FIGS. 2-5C, the pyrotechnic device 22 includes a shuttle 24 that moves along the vehicle body 12 from an undeployed position (FIG. 5A) to a deployed position (FIG. 5C) to pull the airbag 18 across the moonroof opening 14, as described below. In the example shown in FIG. 6, the pyrotechnic device 22 is further defined as a pyrotechnic retractor 26 fixed to the vehicle body 12 and connected to the airbag 18 with a tether 56 that is retractable by the pyrotechnic retractor 26 to pull the airbag 18 across the moonroof opening 14. Common numerals are used to identify common features of these two examples. FIG. 7 shows the airbag 18 in the inflated position when moved across the moonroof opening 14 in both of the examples in FIGS. 2-5C and FIG. 6.

The vehicle 10 may be any suitable type of automobile, e.g., a passenger or commercial automobile such as a sedan, a coupe, a truck, a sport utility vehicle 10, a crossover vehicle 10, a van, a minivan, a taxi, a bus, etc.

The vehicle body 12, as an example, may be of a unibody construction in which the vehicle body 12 is unitary with a vehicle frame (including frame rails, pillars, roof 38 rails, roof 38 cross-beams, etc.). As another example, the vehicle body 12 and frame may have a body-on-frame construction (also referred to as a cab-on-frame construction) in which the vehicle body 12 and vehicle frame are separate components, i.e., are modular, and the vehicle body 12 is supported on and affixed to the vehicle frame. Alternatively, the vehicle frame and vehicle body 12 may have any suitable construction. The vehicle frame and vehicle body 12 may be of any suitable material, for example, metal (steel, aluminum, etc.), polymeric (e.g., fiber-reinforced plastic), or other suitable material.

The vehicle body 12 define a passenger cabin 36 to house occupants of the vehicle 10. The passenger cabin 36 may extend across the vehicle 10, i.e., from one side to the other side of the vehicle 10. The passenger cabin 36 includes a front end and a rear end with the front end being in front of the rear end during forward movement of the vehicle 10.

With reference to FIG. 1, the vehicle body 12 includes a roof 38. The roof 38 provides cover for occupants for the vehicle 10. The roof 38 may include a roof panel 40 and beams, e.g., a front cross-member 32, a rear cross-member 34, a left roof rail 28, and a right roof rail 30. The vehicle 10 may include a headliner supported by the roof 38 in a passenger cabin 36 of the vehicle 10, e.g., the beams and/or the roof panel 40. The beams support the roof panel 40. The beams and the roof panel 40 may be metal (steel, aluminum, etc.), polymeric (e.g., fiber-reinforced plastic), or other suitable material.

The vehicle body 12, e.g., the roof panel 40, has an interior 42 facing the passenger cabin 36 and an exterior 44 opposite the interior 42. The exterior, e.g., the exterior 44 of the roof panel 40, faces the exterior of the vehicle 10. The exterior 44 may have a class-A surface, i.e., a surface that is a finished surface exposed to view by a customer and free of unaesthetic blemishes and defects.

The front cross-member 32 and the rear cross-member 34 may be elongated cross-vehicle from the left roof rail 28 to the right roof rail 30. The headliner and the roof panel 40 provide class-A surfaces to the roof 38, i.e., surfaces specifically manufactured to have a high-quality, finished aesthetic appearance free of blemishes, etc. The moonroof assembly 50 is supported by the roof 38, as described further below. The headliner is above the passenger cabin 36, e.g., may define the upper boundary of the passenger cabin 36. The headliner may be attached to the cross-members and/or the roof 38 rails. The headliner may be a felt covering a plastic shell or any suitable material.

The vehicle body 12 supports body panels. The body panels include the roof panel 40, hood, a decklid, fenders, etc. The moonroof opening 14 extends through the roof panel 40. Specifically, the roof panel 40 includes an inner lip 46 extending about the moonroof opening 14 and the inner lip 46 may define at least a portion of the moonroof opening 14. The moonroof 16 is disposed between the hood and the decklid. Specifically, the vehicle 10 includes a windshield that extends from the hood to the roof 38 and/or moonroof assembly 50 and a backlite that extends from the decklid to the roof 38 and/or moonroof assembly 50.

Figure 2:
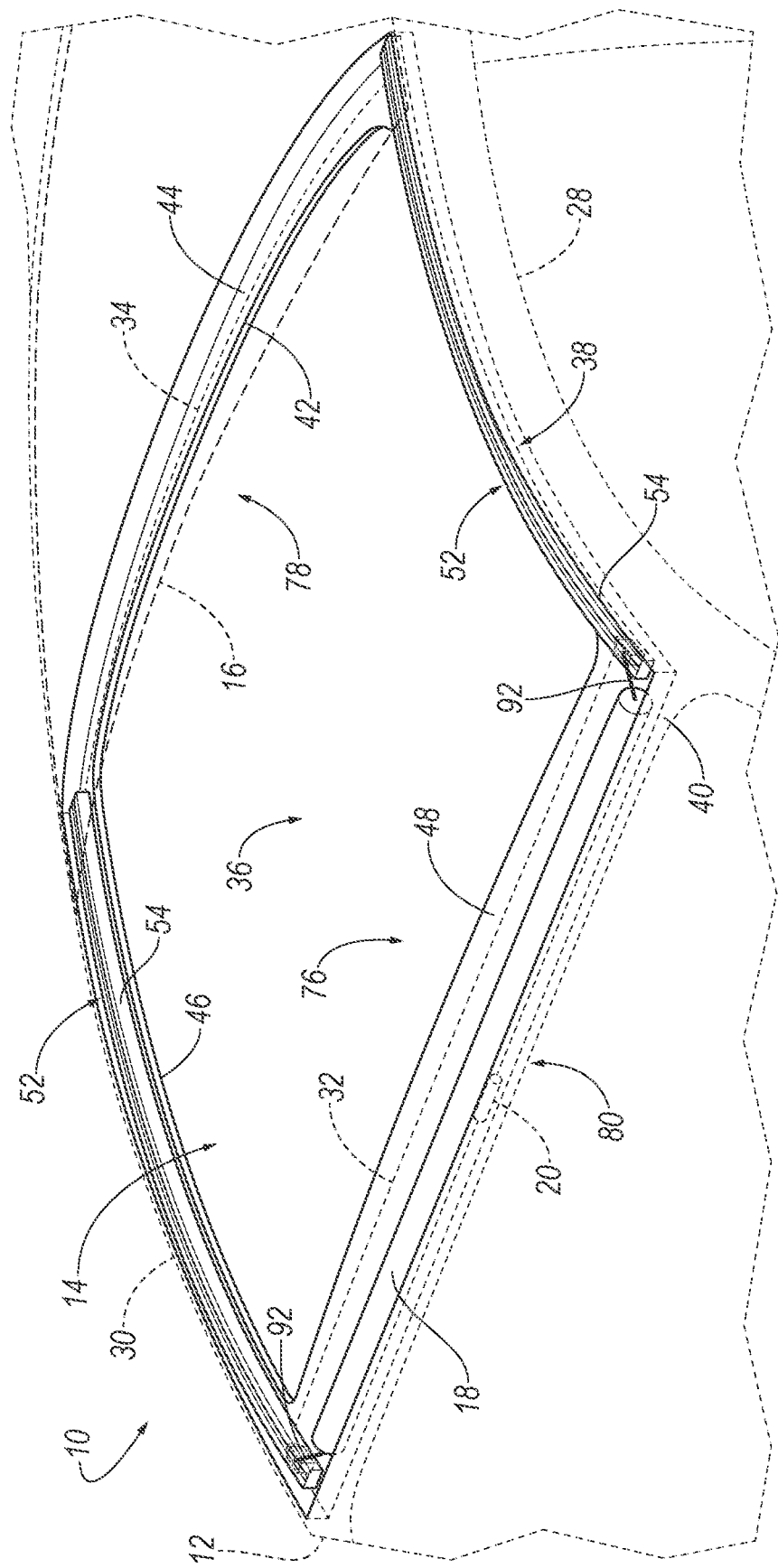
FIG. 2 is a perspective view of a portion of the vehicle with the moonroof in an open position and showing the airbag uninflated and an example of an airbag deployment system.

With reference to FIGS. 2 and 6, the front cross-member 32 and the rear cross-member 34 each extend from the left roof rail 28 to the right roof rail 30. The front cross-member 32 is spaced from the rear cross-member 34 and may define the moonroof opening 14 therebetween. The moonroof opening 14 may extend from the front cross-member 32 to the rear cross-member 34 and, as set forth above, from the roof 38 rail to the roof 38 rail at the top of the vehicle 10. The inner lip 46 of the roof panel 40 may extend along the front cross-member 32, the rear cross-member 34, the left roof rail 28, and the right roof rail 30. The moonroof opening 14 passes from a passenger cabin 36 of the vehicle 10 to outside the vehicle 10.

The windshield may be of any suitable transparent material, e.g., glass, plastic, etc. The windshield faces forward at a front of the passenger cabin 36. The windshield is affixed to the front cross-member 32 and to front pillars and adjacent to the hood. The windshield may be affixed to the front cross-member 32 and/or the pillars with adhesive of any suitable type.

The backlite may be of any suitable transparent material, e.g., glass, plastic, etc. The backlite faces rearward at a rear of the passenger cabin 36. The backlite is spaced from the windshield and is adjacent to the decklid. The backlite is affixed to the rear cross-member 34 and to the rear pillars. For example, the backlite may be affixed to the rear cross-member 34 and/or the rear pillars with adhesive of any suitable type.

Figure 3:
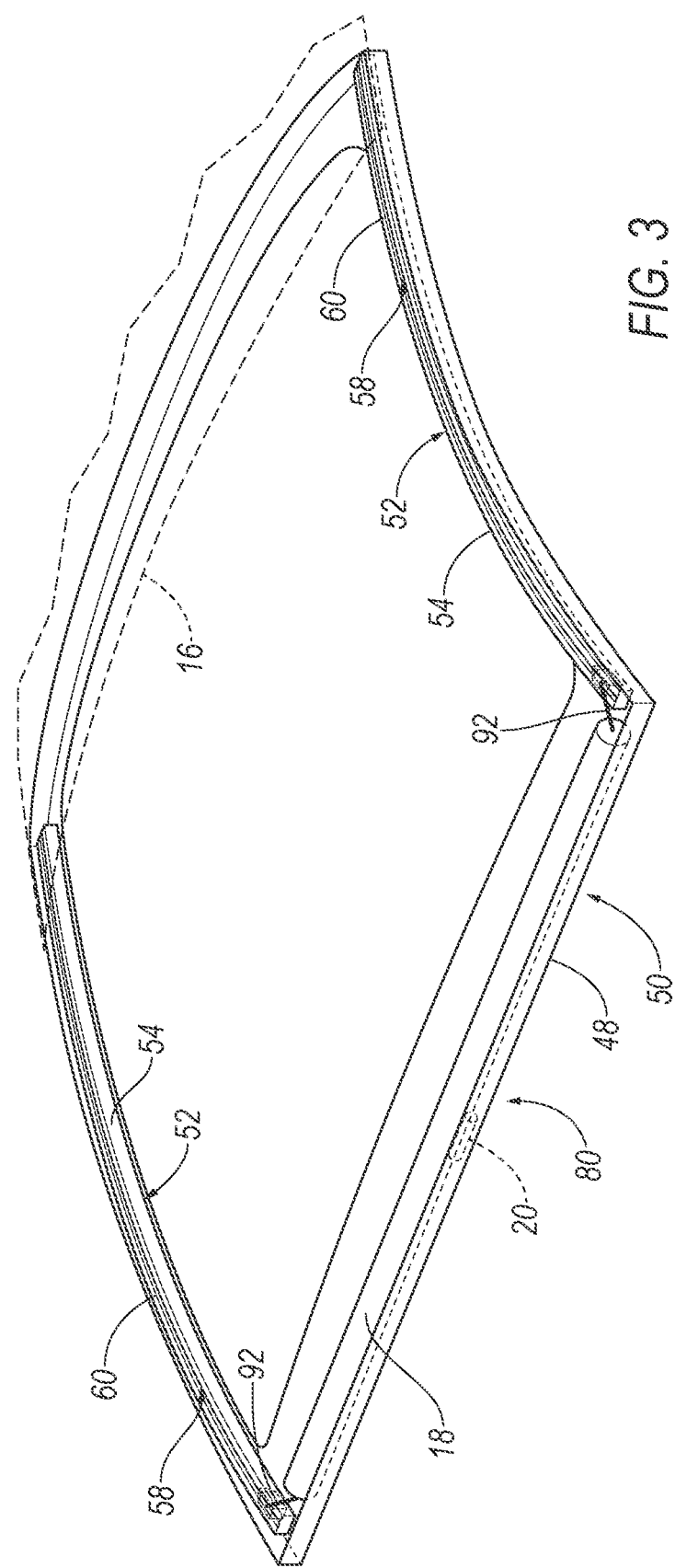
FIG. 3 is a perspective view of the moonroof assembly.

The moonroof assembly 50 may include the moonroof 16 supported on a moonroof frame 48 (FIG. 3). The moonroof frame 48 is fixed to the vehicle 10 roof 38, as described below. The moonroof 16 may be slideably engaged with the moonroof frame 48 to move between the open and closed positions, including in some examples structure that is currently known in the art. As an example, the moonroof assembly 50 may include two slides (not shown) between the moonroof 16 and the moonroof frame 48 and extending along a longitudinal axis of the vehicle 10, including slides currently known. In such examples, the slides moveably connect the moonroof 16 to the moonroof frame 48. In such examples, a seal (not shown) may be located between the moonroof frame 48 and the moonroof 16. The seal abuts both the moonroof frame 48 and the moonroof 16 when the moonroof 16 is in the closed position. The seal may be affixed to one of the moonroof frame 48 and the moonroof 16.

The moonroof assembly 50 may include a drive motor (not shown) that moves the moonroof 16 between the open and closed positions, e.g., moving the moonroof 16 along the slides. The moonroof assembly 50 may include any suitable number of drive motors, i.e., one or more. The drive motor may be supported on the moonroof frame 48. The drive motors can be electric motors. The connection between the drive motors and the moonroof 16 can be any suitable moveable mechanical connection, such as gears, pulleys, Bowden cables, etc.

The moonroof frame 48 may be of any suitable material, such as metal (steel, aluminum, etc.), polymeric (e.g., fiber-reinforced plastic), or other suitable material. The moonroof frame 48 supports moonroof 16, e.g., supports the slides that support the moonroof 16. The moonroof frame 48 moveably supports the moonroof 16 through the slides. The moonroof frame 48 may be fixed to the front cross-member 32, the rear cross-member 34, the left roof rail 28, and/or the right roof rail 30, e.g., with threaded fasteners, adhesive, welding, etc.

The moonroof 16 may be of any suitable material. For example, the moonroof 16 may be a transparent material, e.g., glass, plastic, etc. The transparent material of the moonroof 16 may be the same type of material as the windshield and/or the backlite, or may be of a different type of material. As another example, the moonroof 16 may be an opaque material, e.g., metal (steel, aluminum, etc.), polymeric (e.g., fiber-reinforced plastic), or other suitable material. The opaque material of the moonroof 16 may be the same type of material as the vehicle body 12 or may be formed of a different type of material.

The moonroof assembly 50 is shown isolated from the roof 38 in FIG. 3 with the moonroof 16 (shown in broken lines for illustrative purposes) in the open position. The moonroof assembly 50 is disposed in the moonroof opening 14. Specifically, the moonroof frame 48 is fixed to the roof 38. The moonroof frame 48 is supported on and/or fixed to the front cross-member 32, the rear cross-member 34, the left roof rail 28, and the right end roof 38 rail. Additional structures or components may be intermediate between the moonroof frame 48 and the front cross-member 32, the left roof rail 28, and/or the right end roof 38 rail.

In the closed position, the moonroof 16 covers the moonroof opening 14 and is sealed to the moonroof opening 14, e.g., at the inner lip 46 with the seal. The moonroof 16 may move vehicle-rearward from the closed position to the open position and vehicle-forward from the open position to the closed position. In the open position, the moonroof 16 may be cantilevered from the moonroof frame 48, that is, the moonroof 16 may be fixed at a vehicle-forward end and supported at the vehicle-forward end. In the closed position, the moonroof 16 is adjacent the roof 38 so the moonroof 16 borders the roof 38 and there is nothing between the moonroof 16 and roof 38.

The moonroof assembly 50 includes the airbag 18 and an airbag deployment system 52. The airbag deployment system 52 pulls the airbag 18 across the moonroof opening 14 when the moonroof 16 is in the open position in response to certain vehicle impacts.

The airbag deployment system 52 includes the pyrotechnic device 22. Two examples of the airbag deployment system 52 are shown in the Figures. Specifically, in the example shown in FIGS. 2-5C, the airbag deployment system 52 includes a track 54 and the pyrotechnic device 22 includes a shuttle 24 that moves along the track 54 from the undeployed position to the deployed position to pull the airbag 18 across the moonroof opening 14. In the example shown in FIG. 6, the pyrotechnic device 22 is further defined as the pyrotechnic retractor 26 fixed to the vehicle body 12 and the airbag deployment system 52 is connected to the airbag 18 with at least one tether 56 that is retractable by the pyrotechnic retractor 26 to pull the airbag 18 across the moonroof opening 14.

With reference to the example shown in FIGS. 2-5C, the moonroof assembly 50 may include the track 54 elongated along the moonroof opening 14. The airbag 18 is slideable along the track 54 when the pyrotechnic device 22 is activated during certain vehicle impacts when the moonroof 16 is in the open position. Specifically, in the example shown in FIGS. 2-5C, the pyrotechnic device 22 includes the shuttle 24 slideably engaged with the track 54. The shuttle 24 is connected to the airbag 18 with a tether 92. When activated, the pyrotechnic device 22 slides along the track 54 from the undeployed position to the deployed position, e.g., vehicle-rearward in the example shown in the Figures. The airbag 18 is fixed to the shuttle 24 through the tether 92 and the airbag 18 moves with the shuttle 24 along the track 54 as the shuttle 24 moves from the undeployed position to the deployed position. The shuttle 24 and the track 54 are sized and shaped so that the shuttle 24 slides along the track 54 when activated, as described below. The track 54 may be fixed directly to the moonroof frame 48, e.g., with threaded fastener, adhesive, welding, etc. The track 54 may be metal (steel, aluminum, etc.), polymeric (e.g., fiber-reinforced plastic), or other suitable material In the example shown in FIGS. 2-5C, the moonroof assembly 50 includes a pair of tracks 54 spaced from each other cross-vehicle on opposite sides of the moonroof opening 14. The tracks 54 extend along the moonroof opening 14. Specifically, the tracks 54 may be elongated in parallel with each other along the moonroof opening 14. In such an example, the moonroof assembly 50 may include two pyrotechnic devices 22, specifically, one shuttle 24 slideably engaged with one of the tracks 54 and another shuttle 24 slideably engaged with the other of the tracks 54.

With reference to FIGS. 4-5C, the track 54 is designed to retain the shuttle 24 on the track 54 as the shuttle 24 slides along the track 54 when the pyrotechnic device 22 is activated. For example, the track 54 may include a cavity 58 elongated along the longitudinal axis of the track 54. The shuttle 24 may have a cross-sectional shape that slideably engages the track 54, e.g., slideably engaged with cavity 58. In the example shown in FIGS. 4-5C, the shuttle 24 has a rectangular shape and the track 54 has a rectangular cavity 58 sized for the shuttle 24 to be retained to and slideable along the track 54. Specifically, the shuttle 24 is retained in the cavity 58 and slideable along the track 54. In other examples, the shuttle 24 and the track 54 may have any suitable shape and configuration such that the shuttle 24 is retained to and slideable along the track 54.

The track 54 may include a slot 60 open to the cavity 58. The slot 60 is elongated along the axis of the track 54. The slot 60 may face upwardly, as shown in the example in FIGS. 2-4C. As the pyrotechnic device 22 slides along the track 54, the tether 92 extends through and slides along the slot 60 as the pyrotechnic device 22 slides along the track 54 to pull the airbag 18 across the moonroof opening 14. The slot 60 may be smaller than the shuttle 24 cross-vehicle to retain the shuttle 24 in the cavity 58. Specifically, the track 54 may include opposing flanges defining the slot 60. In other words, the flanges are spaced from each other along the slot 60.

In the example shown in FIGS. 2-5C, the pyrotechnic device 22 incudes the shuttle 24 and a pyrotechnic charge housed in the shuttle 24. Specifically, the shuttle 24 includes a chamber that houses the pyrotechnic charge. Activation of the pyrotechnic charge propels the shuttle 24 along the track 54, e.g., vehicle-rearward in the example shown in the Figures. For example, the shuttle 24 may include an exhaust port facing vehicle-forward and in communication with the pyrotechnic charge, e.g., in communication with the chamber of the shuttle 24, such that when the pyrotechnic charge is activated, the exhaust of the pyrotechnic charge propels the shuttle 24 vehicle-rearward.

The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$). A computer 62 of the vehicle 10, e.g., a restraints control module, may activate the pyrotechnic charge. The pyrotechnic device 22 includes wiring, an activator, etc., to activate the pyrotechnic charge in response to a command from the computer 62.

The track 54 retains the shuttle 24 after activation of the pyrotechnic charge. In other words, during and after activation of the pyrotechnic charge, the shuttle 24 remains in the track 54 from the undeployed position to the deployed position and at the deployed position.

With continued reference to the example shown in FIGS. 2-5C, the moonroof assembly 50 may include a lock 64 between the track 54 and the shuttle 24 at a vehicle-rearward end of the track 54. The lock 64 allows the shuttle 24 to move from the undeployed position to the deployed position and locks the shuttle 24 relative to the track 54 in the deployed position at the vehicle-rearward end of the track 54. Specifically, the lock 64 is designed to prevent movement of the shuttle 24 from deployed position toward the undeployed position after the shuttle 24 reaches the deployed position. As one example, in the example shown in the Figures, the lock 64 includes a bore 66 on one of the track 54 and the shuttle 24 and a spring-loaded pin 68 in the bore 66. The spring-loaded pin 68 is designed to extend into the cavity 58 of the track 54 in the deployed position to lock the shuttle 24 relative to the track 54 in the deployed position.

In the example shown in FIGS. 4-5C, the spring-loaded pin 68 is on the track 54 and engages the shuttle 24. In other examples, the lock 64 may be on the shuttle 24 and may engage the track 54 in the deployed position. In the example shown in FIGS. 4-5C, the pin 68 is slideably retained to a bore 64 in the track 54. Specifically, the lock 64 includes a spring 70 retained in a bore 64 of the track 54. In that example, the pin 68 extends into the cavity 58 of the track 54 such that the shuttle 24 depresses the pin 68 into the bore 64 against the bias of the spring 70, i.e., compressing the spring 70, as the shuttle 24 moves past the pin 68 as the shuttle 24 moves to the deployed position. After the shuttle 24 moves past the pin 68, the spring 70 returns the pin 68 into the cavity 58 and prevents movement of the shuttle 24 past the pin 68 away from the deployed position toward the undeployed position. In the example shown in the Figures, the shuttle 24 and/or the pin 68 include a ramped face 72, 73. In the example shown in FIGS. 4A-C, both the shuttle 24 and the pin 68 include the ramped face 72, 73. The ramped face 72 of the pin 68 faces the shuttle 24 in the undeployed position and the pin 68 includes a stop face 74 facing the shuttle 24 in the deployed position. The ramped faces 72 of the pin 68 and the shuttle 24 are configured to allow the shuttle 24 to ride along the pin 68 to depress the pin 68 into the cavity 58 against the bias of the spring 70. For example, the ramped faces 72, 73 are at non-right angles to walls of the cavity 58 so that the shuttle 24 rides along the pin 68 and depresses the pin 68 into the bore 64. The stop face 74 is configured to prevent the shuttle 24 from passing the pin 68 when the shuttle 24 abuts the stop face 74. The stop face 74 may be perpendicular to the walls of the cavity 58 so that the shuttle 24 abuts the stop face 74 without depressing the pin 68 against the bias of the spring 70.

In the example shown in FIGS. 4A-C, the lock 64 includes two pins 68 opposing each other with each pin 68 loaded in the cavity 58 with the spring 70. The pin 68s oppose each other such that the shuttle 24 moves the pins 68 away from each other into their respective bore 66 against the bias of their respective spring. When the shuttle 24 is in the deployed position, the pins 68 are extended into the cavity 58 so that the shuttle 24 abuts the stop face 74s of both pins 68 if the shuttle 24 moves toward the pins 68 from the deployed position.

In the example shown in FIG. 6, the airbag deployment system 52 includes the pyrotechnic retractor 26 and the tether 56 extending from the pyrotechnic retractor 26 to the airbag 18. The tether 56 is retractable into the pyrotechnic device 22 when the pyrotechnic retractor 26 is activated, as described further below.

The pyrotechnic retractor 26 is fixed to the vehicle body 12 and a portion of the airbag 18 is fixed to the vehicle body 12, as described further below. Specifically, the moonroof opening 14 has a vehicle-forward end 76 and a vehicle-rearward end 78. The airbag 18 is mounted at the vehicle-forward end 76 and the pyrotechnic retractor 26 is mounted to the vehicle-rearward end 78. When the pyrotechnic device 22 is activated, the pyrotechnic device 22 pulls a portion of the airbag 18 vehicle-rearward across the moonroof opening 14.

The tether 56 is connected to the airbag 18. Specifically, the tether 56 extends continuously from the pyrotechnic retractor 26 to the airbag 18. The tether 56 extends into the pyrotechnic retractor 26, as described below. The tether 56 is connected to the airbag 18 in any suitable way such that the tether 56 pulls the airbag 18 across the moonroof opening 14 when the pyrotechnic retractor 26 is activated. As an example, the tether 56 may be stitched, adhered, bonded, etc., to the airbag 18.

As one example, the tether 56 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The pyrotechnic retractor 26 is fixed to the vehicle body 12. As an example, the pyrotechnic retractor 26 may be fixed directly to the moonroof frame 48, as shown in FIG. 6, and the moonroof frame 48 may be directly connected to the vehicle body 12, as described above. The pyrotechnic retractor 26 may be fixed to the moonroof frame 48, for example, with threaded fasteners, adhesive, welding, etc.

The tether 56 is retractable into the pyrotechnic retractor 26 when the pyrotechnic retractor 26 is activated. The pyrotechnic retractor 26 may be any suitable type such as a rotary actuator, in which the pyrotechnic charge rotates a shaft connected to the tether 56 such that the tether 56 wraps around the shaft when the pyrotechnic retractor 26 is activated. With reference to the example in FIG. 6, the pyrotechnic retractor 26 includes a pyrotechnic charge that is combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$). A computer 62 of the vehicle 10, e.g., a restraints control module, may activate the pyrotechnic charge. The pyrotechnic device 22 includes wiring, an activator, etc., to activate the pyrotechnic charge in response to a command from the computer 62.

The vehicle 10 includes an airbag assembly 80 that includes the airbag 18 and an inflator 20. The inflator 20 inflates the airbag 18 to the inflated position, as described further below. In the example shown in the Figures, the airbag 18 is rolled in the uninflated position and a portion of the airbag 18 is fixed to the moonroof assembly 50, e.g., with threaded fasteners, clips, brackets, etc. In some examples, the airbag assembly 80 may include an airbag housing. In such examples, the airbag housing houses the airbag 18 in the uninflated position and supports the airbag 18 in the inflated position. The airbag 18 may be rolled and/or folded to fit within the airbag housing in the uninflated position. In examples including the airbag housing, the airbag housing may be of any suitable material, e.g., a rigid polymer, a metal, a composite, or a combination of rigid materials.

The airbag 18 is fixed to the vehicle body 12. For example, the airbag 18 may be fixed directly to the moonroof frame 48 (e.g., with threaded fasteners, clips, brackets, etc.) and the moonroof frame 48 may be fixed directly to the vehicle body 12, as described above. In examples in which the airbag assembly 80 includes the airbag housing, the airbag housing may, for example, include threaded fasteners, clips, brackets, etc. for attaching the airbag 18 and for attaching the airbag assembly 80 to the vehicle body 12, e.g., through the moonroof frame 48.

The airbag assembly 80 is mounted to the vehicle body 12, e.g., through the moonroof frame 48, at the moonroof opening 14, i.e., with the absence of anything between the airbag assembly 80 and the moonroof opening 14 when the airbag 18 is uninflated. Accordingly, the airbag 18 is inflatable at the moonroof opening 14 and the airbag deployment system 52 pulls the airbag 18 across the moonroof opening 14, as set forth above.

As shown in FIG. 1, the airbag 18 may be below the moonroof 16 when the moonroof 16 is in the closed position. Specifically, the airbag 18 may be between the moonroof 16 and the vehicle body 12 when the moonroof 16 is in the closed position. When the moonroof 16 is in the open position, the airbag 18 is uncovered by the moonroof 16 and is free to inflate. In other words, when the moonroof 16 is in the open position the airbag 18 is not covered by the moonroof 16, so that the airbag 18 can inflate over the moonroof opening 14. The airbag 18 does not inflatable when the moonroof 16 is closed position and the computer 62 does not command the airbag 18 to inflate when the moonroof 16 is in the closed position.

When the moonroof 16 is in the open position, the airbag 18 is inflatable in response to detection of certain vehicle impact. Specifically, the airbag 18 is inflatable above the moonroof opening 14 and exterior 44 to the passenger cabin 36.

The airbag 18 is inflatable to an inflated position in which the airbag 18 covers the moonroof opening 14 exterior 44 to the vehicle body 12. Specifically, the airbag 18 in the inflated position may extend above the entire moonroof opening 14, i.e., from a vehicle-forward edge to a vehicle-rearward edge of the moonroof opening 14 and from a vehicle-left edge of to a vehicle-right edge of the moonroof opening 14.

The airbag 18 is inflatable above the exterior 44 of the roof panel 40. The airbag 18 in the inflated position may include a front portion 82 that extends vehicle-forward of the moonroof opening 14 above a forward end of the roof panel 40. Similarly, the airbag 18 in the inflated position may include a rear portion 84 that extends vehicle-rearward of the moonroof opening 14 above a rearward end of the roof panel 40.

The airbag 18 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 20 is in fluid communication with the airbag 18. The inflator 20 expands the airbag 18 with inflation medium, such as a gas, to move the airbag 18 from the uninflated position to the inflated position. The inflator 20 is supported by the vehicle body 12 and, specifically, may be supported on the moonroof frame 48 that is supported by the vehicle body 12, as described above. As an example, the inflator 20 may be supported by the airbag housing in examples including the airbag housing. The inflator 20 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 20 may be, for example, at least partially in the inflation chamber to deliver inflation medium directly to the inflation chamber or may be connected to the inflation chamber through fill tubes, diffusers, etc.

The computer 62 includes a processor and memory such as are known. The memory includes one or more forms of computer 62 readable media, and stores instructions executable by the computer 62 for performing various operations, including as disclosed herein. The computer 62 may include programming to operate one or more of vehicle brakes, propulsion (e.g., control of acceleration in the vehicle 10 by controlling one or more of an internal combustion engine, electric motor, hybrid engine, etc.), steering, climate control, interior and/or exterior lights, etc., as well as to determine whether and when the computer 62, as opposed to a human operator, is to control such operations. Additionally, the computer 62 may be programmed to determine whether and when a human operator is to control such operations.

The computer 62 may include or be communicatively coupled to, e.g., via a vehicle 10 network such as a communications bus as described further below, more than one processor, e.g., included in components such as sensors, electronic controller units (ECUs) or the like included in the vehicle 10 for monitoring and/or controlling various vehicle components, e.g., a powertrain controller, a brake controller, a steering controller, etc.

The computer 62 has a processor and a memory storing instructions executable by the processor to deploy the airbags 18. The computer 62 may be, for example, a restraints control module. Use of "in response to," "based on," and "upon determining" herein indicates a causal relationship, not merely a temporal relationship.

Figure 9:
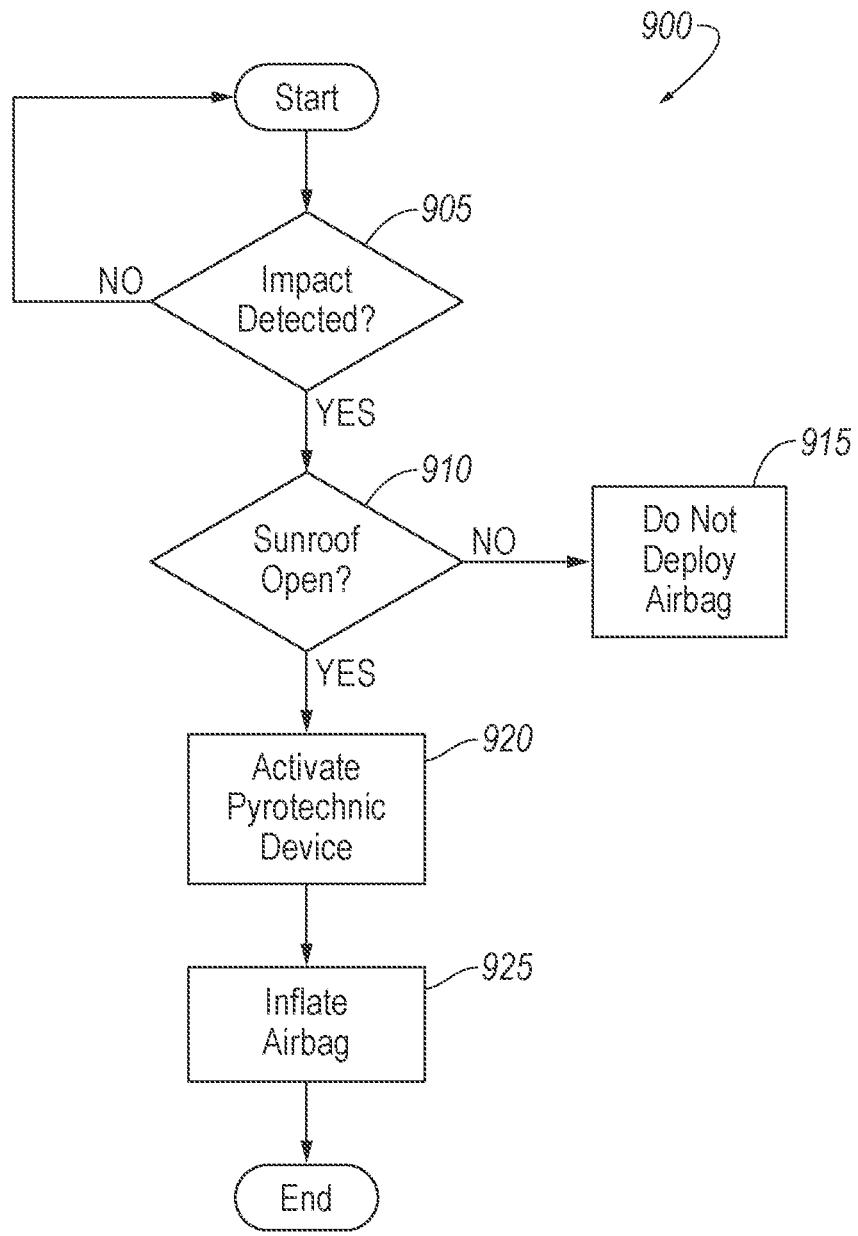
FIG. 9 is a flow chart of an example process.

The vehicle 10 may include at least one impact sensor 86 for sensing certain impacts of the vehicle 10, as shown in block 905 of FIG. 9. The impact sensor 86 is in communication with the computer 62. The computer 62 may activate the inflator 20, e.g., provide an impulse to the pyrotechnic charge of the inflator 20, and may activate the pyrotechnic device 22, e.g., provide an impulse to the pyrotechnic charge of the pyrotechnic device 22, when the impact sensor 86 senses certain impacts of the vehicle 10 and the moonroof 16 is in the open position. Alternatively or additionally to sensing impact, the impact sensor 86 may be configured to sense certain impacts prior to impact, i.e., pre-impact sensing. The impact sensor 86 is configured to detect certain impacts to the vehicle 10. The impact sensor 86 may be of any suitable type, for example, post-contact sensors such as accelerometers, pressure sensors, and contact switches; and pre-impact sensor 86s such as radar, LIDAR, and vision-sensing systems. The vision-sensing systems may include one or more cameras, CCD image sensors, CMOS image sensors, etc. The impact sensor 86 may be located at numerous points in or on the vehicle 10.

The computer 62 in the Figures illustrates an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit) ASIC (an electronic circuit, a processor) shared, dedicated, or group (and/or memory) shared, dedicated, or group (that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 10 includes a communication network 88 that can include a bus in the vehicle 10 such as a controller area network (CAN) or the like, and/or other wired and/or wireless mechanisms. Via the network 88, the computer 62 may transmit messages to various devices in the vehicle 10 and/or receive messages (e.g., CAN messages) from the various devices, e.g., sensors, an actuator, a human machine interface (HMI), etc. Alternatively or additionally, in cases where the computer 62 actually comprises a plurality of devices, the vehicle 10 communication network may be used for communications between devices represented as the computer 62 in this disclosure. Further, as mentioned below, various controllers and/or sensors may provide data to the computer 62 via the vehicle 10 communication network.

The vehicle 10 may include a moonroof position sensor 94 to determine the position of the moonroof 16 as open or closed, as shown in block 910 of FIG. 9. The moonroof position sensor 94 may be in communication with the computer 62. The moonroof position sensor 94 may send a signal to the computer 62 to communicate the position of the moonroof 16. The moonroof position sensor 94 may be a contact sensor, a magnetic sensor (e.g., Hall-effect sensor), a camera, or any other suitable sensor for sensing the position of the moonroof 16. As another example, the moonroof position sensor 94 may be a component of the motor of the moonroof assembly 50, e.g., a rotary encoder of the motor, etc.

The memory of the computer 62 stores instructions executable by the processor to inflate the airbag 18 and activate the pyrotechnic device 22 in response to detection of certain vehicle impacts and detection of the moonroof 16 in the open position, as shown in blocks 920 and 925 of FIG. 9. Specifically, the computer 62 is programmed to deploy the airbag 18, i.e., activate the inflator 20 and activate the pyrotechnic device 22, in response to certain vehicle impact detected by the impact sensor 86 and in response to detection of the moonroof 16 in the open position. The computer 62 may activate the inflator 20 and the pyrotechnic device 22 simultaneously or at separate times. The computer 62 does not activate the inflator 20 or the pyrotechnic device 22 when the sunroof is not in the open position, as shown in block 915.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle body defining a moonroof opening;
a moonroof moveably supported by the body and moveable relative to the moonroof opening between an open position and a closed position;
an airbag mounted to the vehicle body;
an inflator in fluid communication with the airbag; and
a pyrotechnic device operatively connected to the airbag to pull the airbag across the moonroof opening;
the airbag being inflatable to an inflated position in which the airbag covers the moonroof opening exterior to the vehicle body; and
the airbag being below the moonroof and between the moonroof and the vehicle body when the moonroof is in the closed position, and the airbag being uncovered by the moonroof when the moonroof is in the open position.

2. The vehicle as set forth in claim 1, further comprising a track elongated along the moonroof opening, the airbag being slideable along the track.

3. The vehicle as set forth in claim 2, wherein the pyrotechnic device includes a shuttle fixed to the airbag and slideably engaged with the track.

4. The vehicle as set forth in claim 3, wherein the pyrotechnic device includes a pyrotechnic charge housed in the shuttle.

5. The vehicle as set forth in claim 3, further comprising a lock between the track and the shuttle, the shuttle being moveable by the pyrotechnic device from an undeployed position to a deployed position, the lock being designed to prevent movement of the shuttle from the deployed position toward the undeployed position.

6. The vehicle as set forth in claim 5, wherein the lock includes a spring-loaded pin on one of the track and the shuttle and a hole on the other of the track and the shuttle, the spring-loaded pin being designed to extend into the hole in the deployed position.

7. The vehicle as set forth in claim 3, wherein the airbag is fixed to the shuttle and moves with the shuttle along the track.

8. The vehicle as set forth in claim 1, wherein the pyrotechnic device is fixed to the vehicle body and a tether connected to the airbag, the tether extending from the pyrotechnic device and being retractable into the pyrotechnic device.

9. The vehicle as set forth in claim 1, further comprising a pair of tracks spaced from each other cross-vehicle and elongated in parallel along the moonroof opening, the airbag being slideable along the track.

10. The vehicle as set forth in claim 9, wherein the moonroof opening has a vehicle-forward end and a vehicle-rearward end, the airbag being mounted at the vehicle-forward end and the pyrotechnic device mounted to the vehicle-rearward end.

11. The vehicle as set forth in claim 1, wherein the moonroof opening has a vehicle-forward end and a vehicle-rearward end, the airbag being mounted at the vehicle-forward end and the pyrotechnic device mounted to the vehicle-rearward end.

12. The vehicle as set forth in claim 1, wherein the vehicle body defines a passenger cabin and the airbag is inflatable exterior to the passenger cabin.

13. The vehicle as set forth in claim 12, wherein the vehicle body defines a passenger cabin, the vehicle body having an interior facing the passenger cabin and an exterior opposite the interior, the airbag being inflatable above the exterior.

14. The vehicle as set forth in claim 1, further comprising a computer having a processor and memory storing instructions executable by the processor to inflate the airbag and activate the pyrotechnic device in response to detection of certain vehicle impacts and detection of the moonroof in the open position.

15. The vehicle as set forth in claim 1, further comprising a computer having a processor and memory storing instructions executable by the processor to inflate the airbag and activate the pyrotechnic device in response to detection of certain vehicle impacts and detection of the moonroof in the open position.

16. The vehicle as set forth in claim 1, further comprising:
- an impact sensor;
- a moonroof position sensor that determines the position of the moonroof in the open position or the closed position; and
- a computer having a processor and memory storing instructions executable by the processor to inflate the airbag and activate the pyrotechnic device in response to detection of certain vehicle impacts by the impact sensor and detection of the moonroof in the open position by the moonroof position sensor.

* * * * *